(12) United States Patent
Nguyen

(10) Patent No.: US 8,417,115 B2
(45) Date of Patent: Apr. 9, 2013

(54) QUANTIFYING LINK QUALITY IN AN OPTOELECTRONIC MODULE

(75) Inventor: The' Linh Nguyen, San Jose, CA (US)

(73) Assignee: Finisar Corporation, Sunnyvale, CA (US)

(\*) Notice: Subject to any disclaimer, the term of this patent is extended or adjusted under 35 U.S.C. 154(b) by 330 days.

(21) Appl. No.: 12/831,435

(22) Filed: Jul. 7, 2010

(65) Prior Publication Data

US 2011/0008053 A1 Jan. 13, 2011

Related U.S. Application Data

(60) Provisional application No. 61/224,216, filed on Jul. 9, 2009.

(51) Int. Cl.
*H04B 10/08* (2006.01)
*H04B 17/00* (2006.01)

(52) U.S. Cl.
USPC .............. 398/25; 398/26; 398/27; 398/37; 398/154; 398/155; 375/317

(58) Field of Classification Search .............. 398/20–33, 398/38
See application file for complete search history.

(56) References Cited

U.S. PATENT DOCUMENTS

| | | | | |
|---|---|---|---|---|
| 5,774,242 A | \* | 6/1998 | O'Sullivan et al. | 398/29 |
| 6,801,720 B1 | \* | 10/2004 | Mizuochi et al. | 398/30 |
| 7,466,765 B2 | \* | 12/2008 | Wedding | 375/317 |
| 7,697,635 B2 | \* | 4/2010 | Haslach | 375/317 |
| 2002/0176518 A1 | \* | 11/2002 | Xu | 375/317 |
| 2003/0048859 A1 | \* | 3/2003 | Wedding | 375/317 |
| 2005/0169168 A1 | \* | 8/2005 | Aronson et al. | 370/222 |
| 2006/0093379 A1 | | 5/2006 | Aronson | |
| 2009/0028554 A1 | \* | 1/2009 | Anderson et al. | 398/25 |

FOREIGN PATENT DOCUMENTS

EP 0 920 150 6/1999
EP 1 641 150 3/2006

OTHER PUBLICATIONS

International Search Report and the Written Opinion of the International Searching Authority mailed Jan. 20, 2011 in connection with corresponding International Application No. PCT/US2010/041581.

\* cited by examiner

*Primary Examiner* — Li Liu
(74) *Attorney, Agent, or Firm* — Maschoff Brennan

(57) ABSTRACT

In one example embodiment, an optoelectronic module includes an optical receiver and a post-amplifier. The optical receiver is configured to receive an optical signal and generate an electrical data signal corresponding to the optical signal. The post-amplifier is electrically connected to the optical receiver and is configured to amplify the electrical data signal. The optoelectronic module further includes means for quantifying a quality of the optical signal from which the amplified electrical data signal is derived.

16 Claims, 5 Drawing Sheets

QUANTIFYING LINK QUALITY IN AN OPTOELECTRONIC MODULE

CROSS-REFERENCE TO RELATED APPLICATIONS

The present application claims the benefit of and priority to U.S. Provisional Patent Application No. 61/224,216, entitled "QUANTIFYING LINK QUALITY IN AN OPTOELECTRONIC MODULE," filed Jul. 9, 2009, which application is fully incorporated herein by reference in its entirety.

BACKGROUND

1. Field of the Invention

Embodiments of the invention generally relate to quantifying optical link quality in an optical network. More particularly, some example embodiments relate to an optoelectronic module configured to quantify a quality, such as signal to noise ratio ("SNR"), of a received optical signal.

2. Related Technology

Computing, telecom and networking technology have transformed our world. As the amount of information communicated over networks has increased, high speed transmission has become ever more critical. Many high speed data transmission networks rely on optoelectronic modules, including optoelectronic transceivers and transponders, for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an electro-optic transducer), such as a laser or Light Emitting Diode ("LED"). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optoelectronic module to aid in the control of the optical transmit and receive components, as well as the processing of various data and other signals. For example, such optoelectronic modules typically include a driver (e.g., referred to as a "laser driver" when used to drive a laser signal) configured to control the operation of the optical transmitter in response to various control inputs. The optoelectronic module also generally includes an amplifier (e.g., often referred to as a "post-amplifier") configured to perform various operations with respect to certain parameters of a data signal received by the optical receiver.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

In general, example embodiments of the invention relate to an optoelectronic module configured to quantify a quality, such as signal to noise ratio ("SNR"), of a received optical signal.

In one example embodiment, an optoelectronic module includes an optical receiver and a post-amplifier. The optical receiver is configured to receive an optical signal and generate an electrical data signal corresponding to the optical signal. The post-amplifier is electrically connected to the optical receiver and is configured to amplify the electrical data signal. The optoelectronic module further includes means for quantifying the quality of the optical signal from which the amplified electrical data signal is derived.

In another example embodiment, a method of quantifying link quality in an optoelectronic module includes receiving a data signal at a main channel decision circuit and at an error channel decision circuit of an optoelectronic module, the data signal being derived from an optical signal. The main channel decision circuit retimes the data signal to generate a retimed data signal. An aspect of the error channel decision circuit is adjusted such that it is different than a corresponding aspect of the main channel decision circuit. The error channel decision circuit retimes the data signal to generate a retimed pseudo-data signal. The retimed data signal is compared to the retimed pseudo-data signal. Based on the comparison of the retimed data signal to the retimed pseudo-data signal, a quality of the optical signal is determined.

In yet another example embodiment, an optoelectronic module includes an optical receiver, a post-amplifier, a retiming circuit, and a control module. The post-amplifier is connected to the optical receiver. The retiming circuit is connected to the post-amplifier and includes a main channel decision circuit, an error channel decision circuit, and an exclusive OR circuit. The main channel decision circuit is configured to receive a data signal and to output a retimed data signal. The error channel decision circuit is configured to receive the data signal and to output a retimed pseudo-data signal. The exclusive OR circuit is connected to the main channel decision circuit and the error channel decision circuit. The control module is connected to the error channel decision circuit and the exclusive OR circuit.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify various aspects of some embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
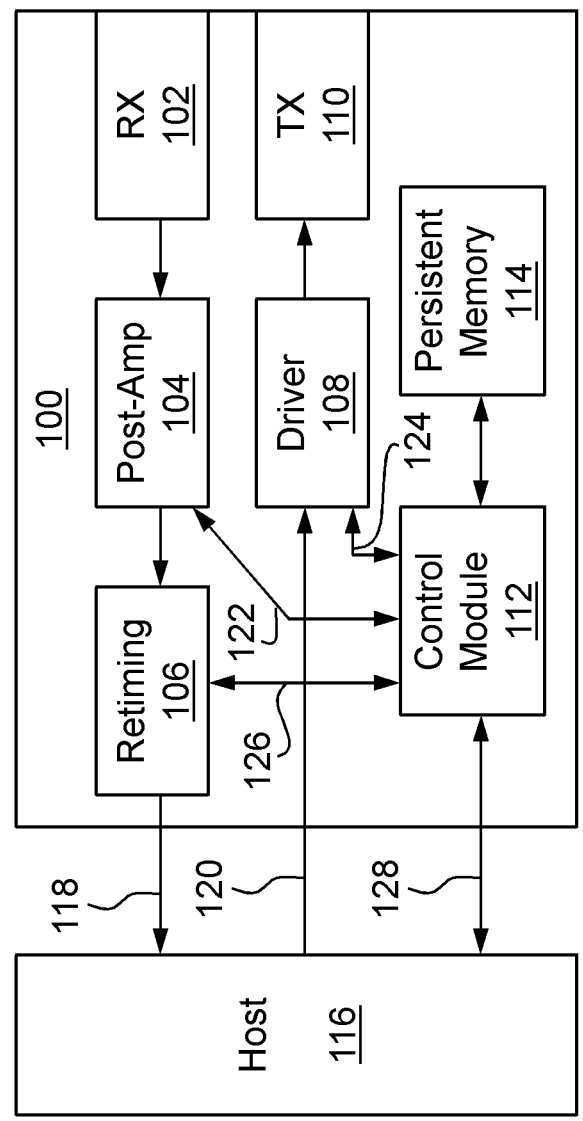
FIG. 1 illustrates an example optoelectronic module including a retiming circuit.

Embodiments of the invention are generally directed to retiming circuits included in optoelectronic modules that can be employed to quantify a quality, such as signal to noise ratio, of an optical signal. Some example embodiments include an optoelectronic module having an optical receiver, a post-amplifier connected to the optical receiver, and a retiming circuit connected to the post-amplifier. In some embodiments, the retiming circuit includes a main channel decision circuit, and an error channel decision circuit, both of which retime a data signal received from the post-amplifier. The threshold and/or timing of the error channel decision circuit can be adjusted. The retiming circuit is configured to compare bits of the data signal retimed by the main channel decision circuit to bits of the data signal retimed by the error channel decision circuit and to output a pseudo error event when the bits are different. In some embodiments, the pseudo error events are counted to calculate a PBER curve. Optionally, a slope of the PBER curve with respect to threshold and/or timing is used to quantify the quality of the optical signal from which the data signal is derived.

The present invention can be implemented in various optoelectronic modules. As used herein, the term "optoelectronic module" includes modules having both optical and electrical components. Examples of optoelectronic modules include, but are not limited to transponders, transceivers, transmitters, and/or receivers. Optoelectronic modules can be used, for instance, in telecommunications networks, local area networks, metro area networks, storage area networks, wide area networks, and the like. The principles of the present invention may be implemented in optoelectronic modules of any form factor currently available or that may be developed in the future, including XFP, SFP, SFP+, without restriction. It will be appreciated, however, that the optoelectronic modules need not comply with standardized form factor requirements and may have any size or configuration necessary according to a particular design.

Further, optoelectronic modules according to embodiments of the invention can be configured for optical signal transmission and reception at a variety of data rates including, but not limited to, 1 Gb/s, 2 Gb/s, 4 Gb/s, 8 Gb/s, 8.5 Gb/s, 10 Gb/s, 14 Gb/s, or higher. Additionally, the optoelectronic modules can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Also, the optoelectronic modules can be configured to support various communication protocols including, but not limited to, Fast Ethernet, Gigabit Ethernet, 10 Gigabit Ethernet, and 1×, 2×, 4×, and 10× Fibre Channel.

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Optoelectronic Module

FIG. 1 schematically illustrates an example optoelectronic module 100 in which the principles of some embodiments may be employed. The optoelectronic module 100 includes an optical receiver 102, post-amplifier 104, retiming circuit 106, laser driver 108, optical transmitter 110, control module 112, and persistent memory 114. While the optoelectronic module 100 will be described in some detail, it is described by way of example only, and not by way of restricting the scope of the invention.

In operation, the optoelectronic module 100 receives an optical signal using optical receiver 102. The optical receiver 102 transforms the optical signal into an electrical signal. The optical receiver 102 provides the resulting electrical signal to a post-amplifier 104. The post-amplifier 104 amplifies the signal and provides the amplified signal to retiming circuit 106. The retiming circuit 106 retimes the amplified signal and provides the retimed signal to a host 116 as represented by arrow 118. The host 116 may be any computing system capable of communicating with the optoelectronic module 100, such as a media access controller ("MAC") card, SONET framer, or the like.

The optoelectronic module 100 may also receive electrical signals from the host 116 for transmission as optical signals. Specifically, the laser driver 108 receives an electrical signal from the host 116, as represented by the arrow 120, and drives the optical transmitter 110 to emit an optical signal. The optical transmitter 110 includes a suitable light source, such as a vertical cavity surface emitting laser ("VCSEL"), distributed feedback ("DFB") laser, distributed Bragg reflector ("DBR") laser, or the like, that is driven by the electrical signals provided by the host 116, thereby causing the light source to emit optical signals representative of the information carried in the electrical signal.

The behavior of the optical receiver 102, the post-amplifier 104, the laser driver 108, and the optical transmitter 110 may vary dynamically due to a number of factors. For example, temperature changes, power fluctuations, and feedback conditions may each affect the performance of these components. Accordingly, the optoelectronic module 100 includes a control module 112, which may evaluate environment conditions, such as temperature, and/or operating conditions, such as emitted optical power and/or wavelength, and receive information from the post-amplifier 104 (as represented by arrow 122) and from the laser driver 108 (as represented by arrow 124). This allows the control module 112 to optimize the dynamically varying performance of the optoelectronic module 100. Specifically, the control module 112 may optimize the operation of the optoelectronic module 100 by adjusting settings on the post-amplifier 104 and/or the laser driver 108 as represented by the arrows 122 and 124.

Alternately or additionally, the control module 112 may receive information from and adjust settings on the retiming circuit 106, as represented by the arrow 126. For instance, as will be explained in greater detail below, the control module 112 can adjust the threshold or timing of an error channel decision circuit within the retiming circuit 106 such that the retiming circuit 106 generates pseudo bit errors as a function of threshold or timing.

The control module 112 may have access to a persistent memory 114, which in some embodiments is an Electrically Erasable and Programmable Read Only Memory ("EEPROM"). Persistent memory 114 may alternately or additionally be any other non-volatile memory source. The persistent memory 114 and the control module 112 may be packaged together in the same package or in different packages without restriction. In some embodiments, the persistent memory 114 stores data points representative of PBER as a function of threshold and/or timing as generated by the retiming circuit 106.

In some embodiments, a host interface 128 is provided for communicating clock and/or data signals from the host 116 to the control module 112 and/or for communicating data from the control module 112 to the host 116. The host interface 128 may implement any one of a variety of communication protocols, including, but not limited to, $I^2C$, MDIO, SPI, or the like or any combination thereof.

II. Retiming Circuit

Figure 2:
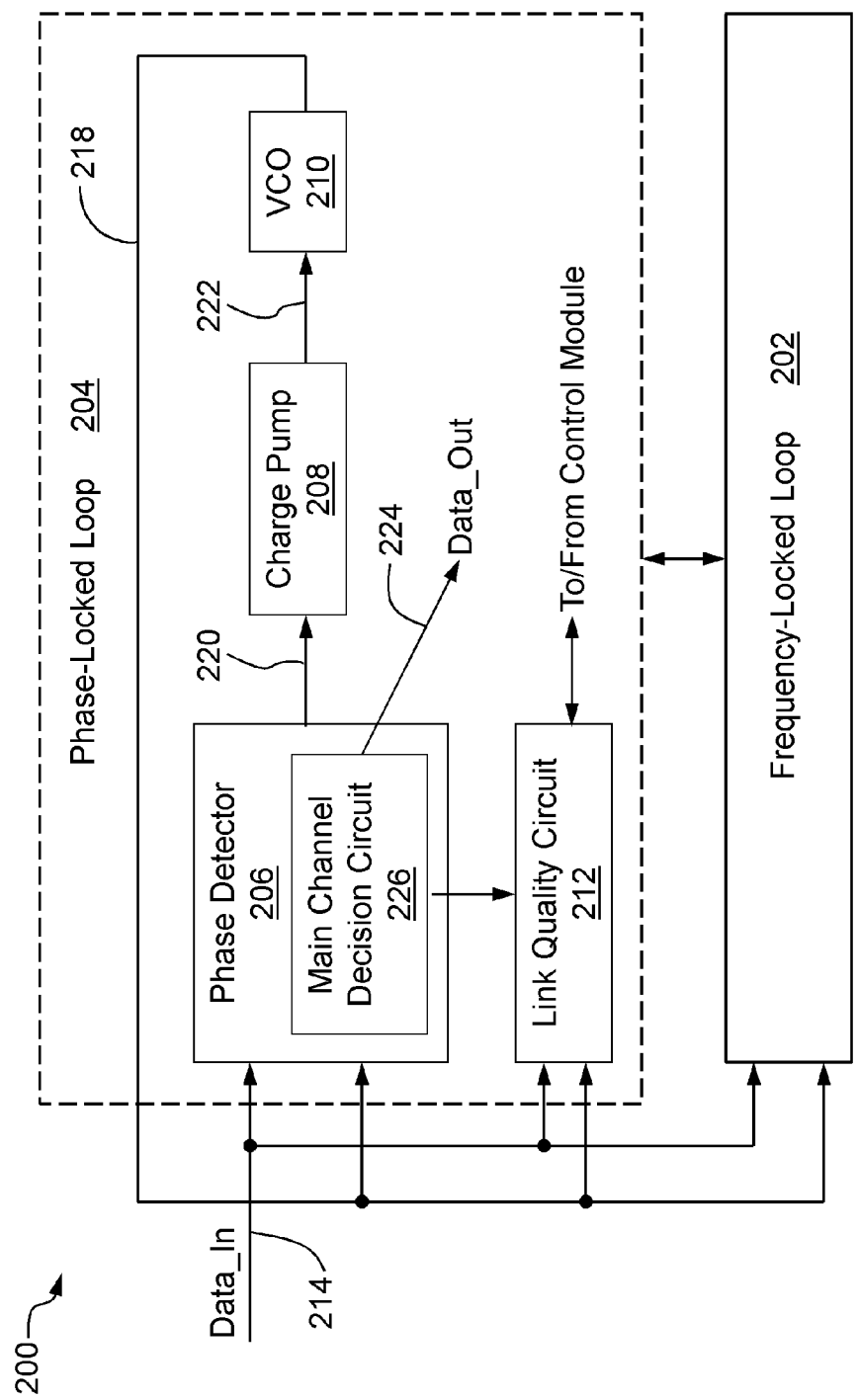
FIG. 2 illustrates an example embodiment of the retiming circuit included in the optoelectronic module of FIG. 1, the retiming circuit including a link quality circuit.

Turning next to FIG. 2, one example of a retiming circuit 200 is disclosed that may correspond to the retiming circuit 106 of FIG. 1. As shown in FIG. 2, the retiming circuit 200 is a clock and data recovery circuit ("CDR"). Further, the retiming circuit 200 includes a frequency-locked loop ("FLL") 202 and a phase-locked loop ("PLL") 204.

In the illustrated example of FIG. 2, the PLL 204 includes a phase detector 206, a charge pump 208, a voltage-controlled oscillator ("VCO") 210, and a link quality circuit 212. Although not shown, the FLL 202 may include, for example, a phase frequency detector ("PFD"), a PFD charge pump, and a loop filter, and/or may share the VCO 210 with the PLL 204.

The retiming circuit 200 receives, from an upstream component such as the post-amplifier 104 of FIG. 1, an incoming data signal 214 that has been derived from an optical signal. The incoming data signal 214 is provided to the FLL 202 and PLL 204. The retiming circuit 200 also receives a clock signal 218 (also referred to as a VCO signal) and provides it to the FLL 202 and PLL 204. In some embodiments, the clock signal 218 is extracted from the incoming data signal 214. Alternately or additionally, the clock signal 218 is received from a host, such as the host 116 of FIG. 1.

In some embodiments, the FLL 202 has a broader acquisition range than the PLL 204 and is used to lock a frequency of the clock or VCO signal 218 output by the VCO 210 onto a frequency of the data signal 214. The FLL 202 monitors the frequency of the data signal 214 and the frequency of the VCO signal 218 and generates a signal indicating a frequency-locked condition when the two frequencies are equal, or within a certain margin.

After the frequency has been locked, the PLL 204 drives any remaining frequency error to zero and aligns the phase of the VCO signal 218 to the phase of the data signal 214. In particular, the phase detector 206 compares the phase of the VCO signal 218 to the phase of the data signal 214. Depending on the magnitude and direction of the phase difference, if any, the phase detector 206 generates a control signal 220 that causes the charge pump 208 to perform a charge pump operation in accordance with the potential of the control signal 220. Based on the charge pump operation, the charge pump 208 outputs a control voltage 222 that adjusts the phase of the VCO signal 218 in the direction of the phase of the data signal 214 until the phase of the VCO signal 218 is locked to the phase of the data signal 214.

After the phase has been locked, the PLL 204 samples the data signal 214 using the frequency- and phase-locked VCO signal 218 to produce a retimed data signal 224. In more detail, the phase detector 206 includes a main channel decision circuit 226 that may also be part of the link quality circuit 212. In some embodiments, the main channel decision circuit 226 samples the incoming data signal 214 at rising edges of the frequency- and phase-locked VCO signal 218 to determine a value (e.g., "1" or "0") for each bit pulse in the incoming data signal 214. The main channel decision circuit 226 then clocks out the determined values using the clock signal 218 to generate the retimed data signal 224.

The phase of the frequency- and phase-locked VCO signal 218 relative to the phase of the incoming data signal 214 is referred to as timing. In some embodiments, the timing can be set, e.g., by a control module such as control module 112 of FIG. 1, for optimum sampling by the main channel decision circuit 226. For instance, in some examples, the timing is set such that the rising edges of the frequency- and phase-locked VCO signal 218 are aligned with the center of each bit pulse in the incoming data signal 214. Alternately, the timing can be set to align the rising edges of the frequency- and phase-locked VCO signal 218 at positions other than the center of the bit pulses.

Further, when the main channel decision circuit 226 is determining a value for each bit pulse in the incoming data signal 214, the main channel decision circuit 226 compares the value of the bit pulse to a specific value referred to as a threshold. In some examples, if the value of the bit pulse is above the threshold, the main channel decision circuit 226 determines that the bit pulse represents a "1," whereas if the value of the bit pulse is below the threshold, the main channel decision circuit 226 determines that the bit pulse represents a "0."

Optionally, the threshold can be set for optimum sampling by the main channel decision circuit 226. For instance, in some examples, the threshold is set to be at a middle of an opening of an eye diagram (see FIG. 4) corresponding to the incoming data signal 214. Further, threshold can be set by increasing or decreasing the specific value that the bit pulses of the incoming data signal 214 are compared to, or by increasing or decreasing the DC level of the incoming data signal 214.

III. Link Quality Circuit

With continued reference to FIG. 2, the link quality circuit 212 is described in greater detail. Generally, the link quality circuit 212 is configured to receive the incoming data signal 214 (e.g., from the post-amplifier 104) and quantify the quality of an optical signal from which the incoming data signal 214 is derived. As such, the link quality circuit 212 is one example of a means for quantifying a quality of an optical signal from which the incoming data signal 214 is derived. As used herein, quantifying a quality of an optical signal can include gathering and reporting data to a control module, which data can be used to calculate a signal to noise ratio ("SNR") of the optical signal.

Figure 3:
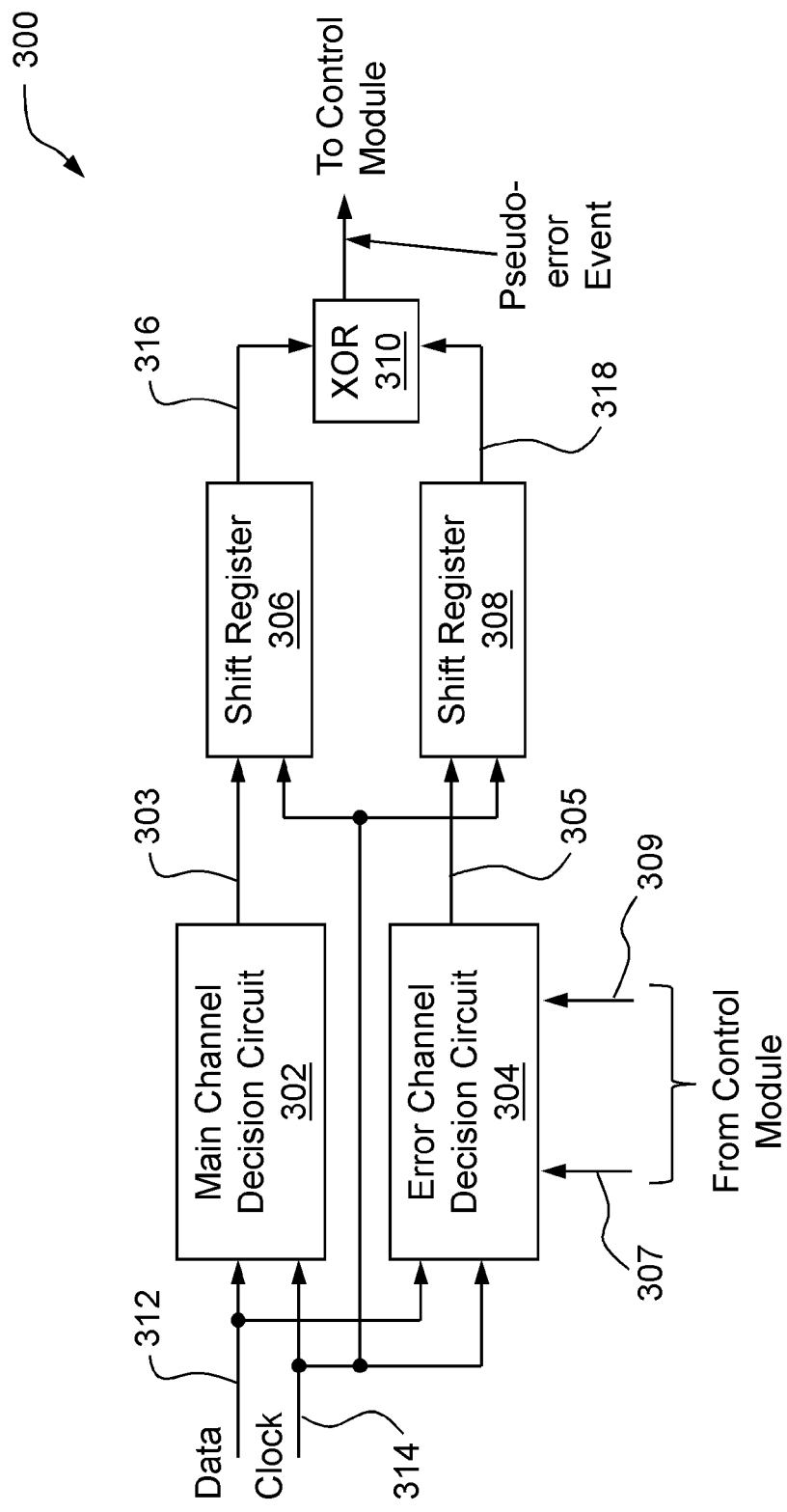
FIG. 3 illustrates an example embodiment of the link quality circuit included in the retiming circuit of FIG. 2.

With additional reference to FIG. 3, one example of a link quality circuit 300 is disclosed that may correspond to the link quality circuit 212 of FIG. 2. In the illustrated embodiment, the link quality circuit 300 includes a main channel decision circuit 302, an error channel decision circuit 304, optional first and second shift registers 306, 308 and an exclusive OR circuit 310. In some examples, the main channel decision circuit 302 is implemented in a phase detector, such as the phase detector 206 of FIG. 2, and corresponds to the main channel decision circuit 226 of FIG. 2.

In operation, the main channel decision circuit 302 and error channel decision circuit 304 receive incoming data signal 312 and clock signal 314. The main channel decision circuit 302 samples the incoming data signal 312 to determine a value for each bit pulse of the incoming data signal 312, as explained above with respect to the main channel decision circuit 226 of FIG. 2. The main channel decision circuit 302 outputs a retimed data signal 303 as shown in FIG. 3.

In a similar manner, the error channel decision circuit 304 samples the incoming data signal 312 to determine a value for each bit pulse of the incoming data signal 312. However, prior to sampling the incoming data signal 312, the threshold and/or timing of the error channel decision circuit 304 is adjusted to be different than the threshold and/or timing of the main channel decision circuit 302. The error channel decision circuit 304 outputs a retimed pseudo-data signal 305 as shown in FIG. 3. The retimed pseudo-data signal 305 is made up of bit pulses representing pseudo data. As used herein, pseudo data refers to data generated by the error channel decision circuit 304 by sampling the incoming data signal 312. The threshold or timing of the error channel decision circuit 304 can be adjusted by a control module, such as the control module 112 of FIG. 1, via a threshold adjust signal 307 or a timing adjust signal 309, respectively.

Although not required, in some examples, the retimed data signal 303 and the retimed pseudo-data signal 305 are provided to, respectively, the first and second shift registers 306, 308. The first and second shift registers 306, 308 retime the retimed data signal 303 and the retimed pseudo-data signal 305 using clock signal 314 and output a double-retimed data signal 316 and a double-retimed pseudo-data signal 318 that are both aligned with the clock signal 314.

The exclusive OR circuit 310 receives the double-retimed data signal 316 and the double-retimed pseudo-data signal 318 and compares them to each other. When a bit in the double-retimed data signal 316 is not substantially equal to a corresponding bit in the double-retimed pseudo-data signal 318, the exclusive OR circuit 310 identifies an error event. In some embodiments, for instance, the exclusive OR circuit 310 outputs a "1" indicative of an error event when a bit in the double-retimed data signal 316 is not substantially equal to a corresponding bit in the double-retimed pseudo-data signal 318, and the exclusive OR circuit 310 outputs a "0" when a bit in the double-retimed data signal 316 is substantially equal to a corresponding bit in the double-retimed pseudo-data signal 318.

The pseudo bit error events identified by the exclusive OR circuit 310 are reported to a control module, such as the control module 112 of FIG. 1, in some examples. Alternately or additionally, the number of clock pulses of the clock signal 314 during a given period in which pseudo bit error events are reported can also be provided to the control module. The reporting of pseudo bit error events and number of clock pulses allows the control module to calculate a PBER for a sample point of threshold and timing values applied to the error channel decision circuit 304.

Further, the steps of adjusting the threshold and/or timing of the error channel decision circuit 304, reporting error events, and reporting corresponding numbers of clock pulses can be iterated any desired number of times to obtain any desired number of data points. In some examples, each data point includes a calculated PBER corresponding to a sample point of threshold and timing values applied to the error channel decision circuit 304 during each iteration. Thus, in some embodiments, the obtained data points are representative of PBER as a function of threshold and timing values. Optionally, the data points can be saved by a control module, such as the control module 112 of FIG. 1, in a persistent memory, such as the persistent memory 114.

Figure 4:
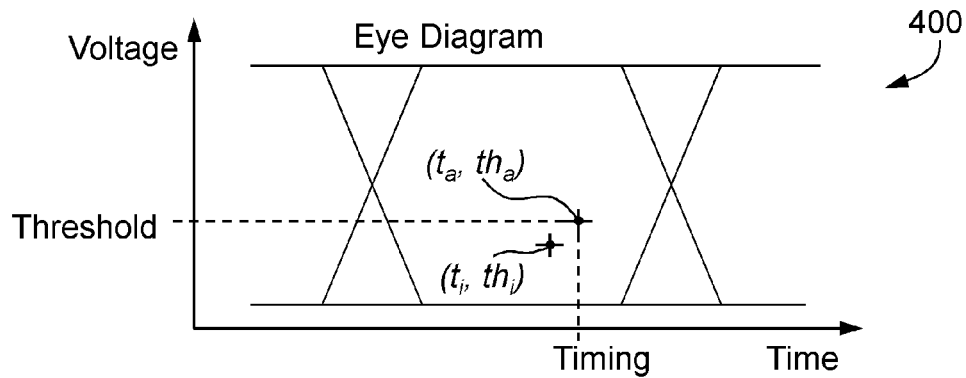
FIG. 4 illustrates an example of an eye diagram corresponding to an incoming data signal received by the ink quality circuit of FIG. 3.

FIG. 4 illustrates an example of an eye diagram 400 that may correspond to the incoming data signal 312. The eye diagram 400 can be used as an aid in visualizing how data points are obtained. In particular, in some embodiments, the main channel decision circuit 302 samples the incoming data signal 312 at an initial timing $t_i$ and an initial threshold $th_i$. In contrast, the error channel decision circuit 304 samples the incoming data signal 312 at an adjusted timing $t_a$ and/or an adjusted threshold $th_a$. The resulting retimed data signal 303 and retimed pseudo-data signal 305 are then retimed by first and second shift registers 306, 308 and compared by exclusive OR circuit 310. Any error events are reported to a control module and a corresponding PBER can be calculated. Accordingly, each data point obtained by iterating the method described herein can include an adjusted timing $t_a$, an adjusted threshold $th_a$, and a corresponding PBER.

The above example has been described as including adjustment of two aspects of the error channel decision circuit 304, including adjustment of the threshold and adjustment of the timing of the error channel decision circuit 304. In other examples, only one aspect of the error channel decision circuit 304 is adjusted. For instance, embodiments of the invention include link quality circuits 300 that adjust either the threshold or the timing, but not both, of the error channel decision circuit 304. In such embodiments, calculated PBERs may correspond to a single threshold or timing value, rather than a pair of threshold and timing values.

For example, some optoelectronic modules include linear receive channels, in which case one or both of the threshold or timing of error decision circuit 304 can be adjusted to calculate PBERs as a function of one or both of the threshold or timing. Other optoelectronic modules include limiting receive channels, in which case only the timing of error decision circuit 304 can be adjusted to calculate PBERs as a function of timing. As used herein, a receive channel refers to one or more components employed to receive a data signal, such as the receiver 102, post-amplifier 104, and retiming circuit 106 in the example of FIG. 1. A receive channel is linear if an output of the receive channel is proportional to an input of the receive channel. In contrast, a receive channel is limiting if the output of the receive channel is not proportional to the input of the receive channel.

Accordingly, and with continued reference to FIG. 3, embodiments of the invention include link quality circuits 300 that omit first and second shift registers 306, 308. In particular, in optoelectronic modules having linear receive channels, the calculation of PBERs can be based solely on adjustments made to the threshold of the error channel decision circuit 304. Where no timing adjustments are made to the error channel decision circuit 304, the retimed data signal 303 and the retimed pseudo-data signal 305 are both already aligned with the clock signal 314 when output from the main channel decision circuit 302 and the error channel decision circuit 304 and there is therefore no need to retime the retimed data signal 303 and the retimed pseudo-data signal 305 at first and second shift registers 306, 308 before providing them to the exclusive OR circuit 310. Alternately or additionally, link quality circuits 300 can include first and second shift registers 306, 308, even where no timing adjustments are made to the error channel decision circuit 304.

As already mentioned, the method described herein can be iterated any desired number of times to obtain any desired number of data points that represent PBER as a function of threshold and/or timing. In some embodiments, the data points can be used to determine a quality of an optical signal from which the incoming data signal 312 is derived. For instance, the data points can be used to determine a signal to noise ratio of the optical signal. In this regard, PBER as a function of timing or threshold is related to the signal to noise ratio of the optical signal from which incoming data signal 312 is derived. As such, the signal to noise ratio of the optical signal can be determined according to some embodiments by determining a slope magnitude of a PBER curve as a function of timing or threshold where the PBER curve is fitted to a set of calculated PBER values as a function of timing or threshold. For instance, a vertical set of calculated PBER values includes PBER values as a function of threshold at a fixed timing. In contrast, a horizontal set of calculated PBER values includes PBER values as a function of timing at a fixed threshold.

Figure 5A:
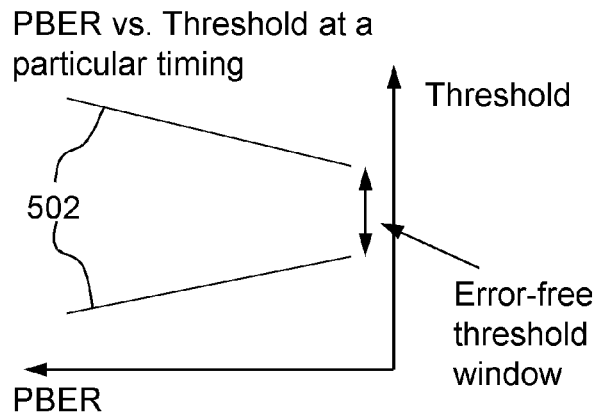
FIG. 5A illustrates an example of a curve fitted to a vertical set of calculated pseudo-bit error rate ("PBER") values as a function of threshold at a fixed timing according to some embodiments.
Figure 5B:
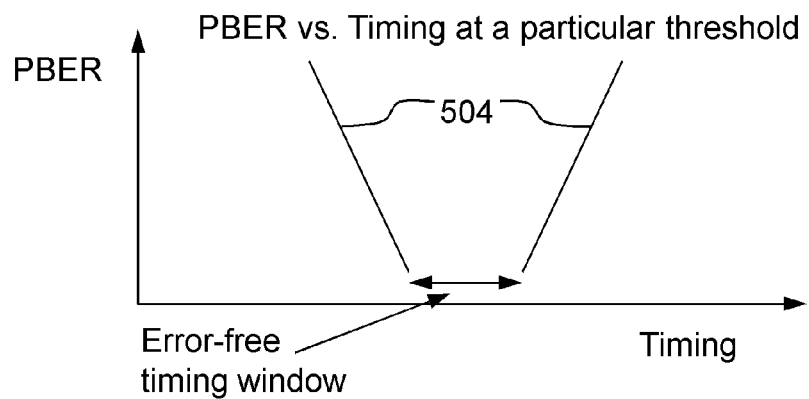
FIG. 5B illustrates an example of a curve fitted to a horizontal set of calculated PBER values as a function of timing at a fixed threshold according to some embodiments.

The determination of signal to noise ratio can be visualized with respect to FIGS. 5A and 5B. FIG. 5A illustrates an example of a curve 502 fitted to a vertical set of calculated PBER values (not shown) as a function of threshold at a particular timing. FIG. 5B illustrates an example of a curve 504 fitted to a horizontal set of calculated PBER values (not shown) as a function of timing at a fixed threshold. In the example of FIG. 5A, the upper part of PBER curve 502 has a slope of −a while the lower part of PBER curve 502 has a slope of +a. Thus, the curve 502 has a slope magnitude of a. In the example of FIG. 5B, the left part of PBER curve 504 has a slope of −b while the right part of PBER curve 504 has a slope of +b. Thus, the curve 504 has a slope magnitude of b.

Once the slope magnitude a or b of PBER curve 502 or 504 is determined, the signal to noise ratio of the corresponding optical signal can then be determined. Generally, the steeper the slope, e.g., the greater the slope magnitude, of PBER curve 502, 504, the higher the signal to noise ratio of the corresponding optical signal.

IV. Example Method

Figure 6:
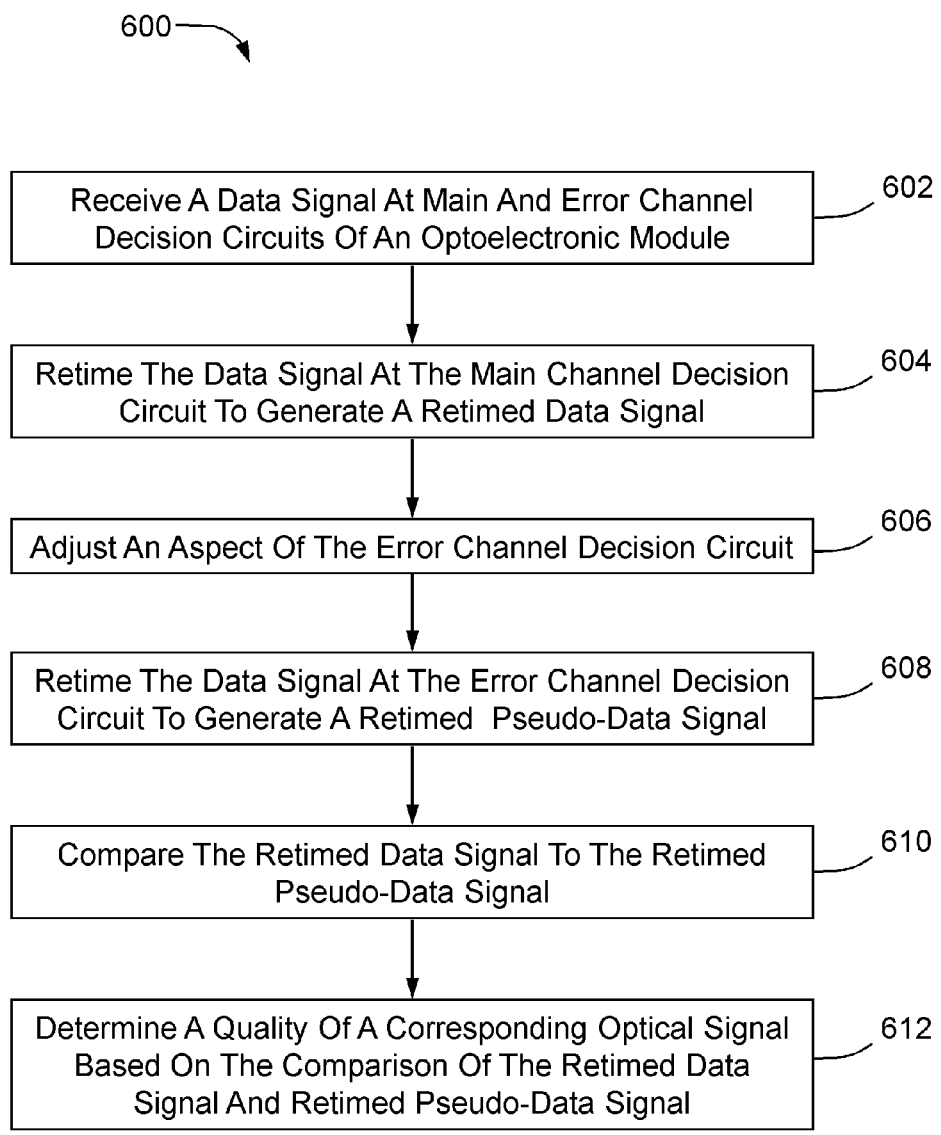
FIG. 6 is a flow chart of an example method of quantifying link quality by the optoelectronic module of FIG. 1.

With additional reference to FIG. 6, an example method 600 of quantifying link quality in an optoelectronic module is illustrated according to some embodiments. The method 600 may be implemented in an optoelectronic module, such as the optoelectronic module 100 of FIG. 1. More particularly, the method 600 may be implemented by a retiming circuit, such as the retiming circuits 106, 200 of FIGS. 1 and 2 including a link quality circuit, such as the link quality circuits 212, 300 of FIGS. 2 and 3, in association with a control module, such as the control module 112 of FIG. 1.

With combined reference to FIGS. 1-6, the method 600 begins at 602 by receiving a data signal 214, 312 at the main channel decision circuit 226, 302 and error channel decision circuit 304 of the link quality circuit 212, 300. The main channel decision circuit 226, 302 and error channel decision circuit 304 also receive a clock signal 218, 314 extracted from the data signal 214, 312 by the retiming circuit 106, 2004 or directly from the host 116.

At 604, the data signal 214, 312 is retimed in accordance with the clock signal 218, 314 at the main channel decision circuit 226, 302 to generate a first retimed data signal 303.

At 606, an aspect of the error channel decision circuit 304 is adjusted relative to a corresponding aspect of the main channel decision circuit 226, 302. In some embodiments, adjusting an aspect of the error channel decision circuit 304 includes adjusting a threshold or timing of the error channel decision circuit 304 relative to a threshold or timing of the main channel decision circuit 226, 302.

At 608, the data signal 214, 312 is retimed in accordance with the clock signal 218, 314 at the main channel decision circuit 226, 302 to generate a retimed pseudo-data signal 305.

Optionally, where the adjusted aspect of the error channel decision circuit 304 from step 606 is the timing, the method 600 further includes aligning timing of the retimed data signal 303 with timing of the retimed pseudo-data signal 305 using, e.g., shift registers 306, 308, to generate double-retimed data signal 316 and double-retimed pseudo-data signal 318.

At 610, the retimed data signal 303 (or double-retimed data signal 316) is compared to the retimed pseudo-data signal 305 (or double-retimed pseudo-data signal 318) by the exclusive OR circuit 310.

At 612, a quality of a corresponding optical signal from which the data signal 214, 312 is derived is determined based on the comparison of the retimed data signal 303 (or double-retimed data signal 316) to the retimed pseudo-data signal 305 (or double-retimed pseudo-data signal 318). The determined quality of the optical signal is signal to noise ratio of the optical signal in some examples.

According to some embodiments, steps 606, 608 and 610 are iterated to obtain multiple data points representing pseudo bit error rate as a function of the adjusted aspect of the error channel decision circuit 304. The multiple data points can then be used, e.g., by the control module 112, to determine the quality of the optical signal at 612. Determining the quality of the optical signal using the multiple data points in some examples includes determining a slope of a PBER curve as a function of the adjusted aspect of the error channel decision circuit 304, the PBER curve being fitted to a set of the multiple data points. According to some embodiments, the slope of the PBER curve is the signal to noise ratio of the optical signal. Alternately or additionally, the signal to noise ratio of the optical signal is directly proportional to the slope of the PBER curve.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module, comprising:
an optical receiver configured to receive an optical signal and generate an electrical data signal corresponding to the optical signal;
a post-amplifier electrically connected to the optical receiver and configured to amplify the electrical data signal; and
a retiming circuit configured to quantify a quality of the optical signal from which the amplified electrical data signal is derived, the retiming circuit including a main channel decision circuit and an error channel decision circuit both configured to receive the amplified electrical data signal output by the post-amplifier and to receive a clock signal, the retiming circuit further including a first shift register connected to an output of the main channel decision circuit, a second shift register connected to an output of the error channel decision circuit, and an exclusive OR circuit connected to outputs of the first shift register and the second shift register.

2. The optoelectronic module of claim 1, further comprising a control module configured to adjust timing, threshold, or both, of the error channel decision circuit relative to corresponding timing, threshold, or both, of the main channel decision circuit.

3. The optoelectronic module of claim 1, wherein the retiming circuit is configured to extract the clock signal from the data signal.

4. The optoelectronic module of claim 1, wherein the retiming circuit is configured to receive the clock signal from a host system.

5. A method of quantifying link quality in an optoelectronic module, the method comprising:
receiving a data signal at a main channel decision circuit and at an error channel decision circuit of an optoelectronic module, the data signal being derived from an optical signal;
retiming the data signal at the main channel decision circuit to generate a retimed data signal;
adjusting an aspect of the error channel decision circuit such that it is different than a corresponding aspect of the main channel decision circuit;
retiming the data signal at the error channel decision circuit to generate a retimed pseudo-data signal;
comparing the retimed data signal with the retimed pseudo-data signal;
identifying, based on the comparison of the retimed data signal with the retimed pseudo-data signal, a pseudo error event when a bit in the retimed data signal is not substantially equal to a corresponding bit in the retimed pseudo-data signal;
calculating a pseudo bit error rate based on a number of pseudo error events identified during a period of time measured by a number of clock pulses of a clock signal; and
determining a quality of the optical signal based on the pseudo bit error rate.

6. The method of claim 5, wherein determining a quality of the optical signal comprises determining signal to noise ratio of the optical signal.

7. The method of claim 5, further comprising iterating the steps of adjusting an aspect of the error channel decision circuit, retiming the data signal at the error channel decision circuit, comparing the retimed data signal to the retimed pseudo-data signal, identifying pseudo error events and calculating a pseudo bit error rate to obtain multiple data points representative of pseudo bit error rate as a function of the adjusted aspect of the error channel decision circuit.

8. The method of claim 7, wherein determining a quality of the optical signal includes determining a slope of a pseudo bit error rate curve fitted to a set of the multiple data points.

9. The method of claim 8, wherein the slope of the pseudo bit error rate curve is proportional to signal to noise ratio of the optical signal.

10. The method of claim 5, further comprising extracting the clock signal from the data signal or receiving the clock signal from a host system.

11. The method of claim 5, wherein adjusting an aspect of the error channel decision circuit includes adjusting threshold or timing of the error channel decision circuit.

12. The method of claim 5, wherein adjusting an aspect of the error channel decision circuit includes adjusting timing of the error channel decision circuit, the method further comprising aligning timing of the retimed data signal with timing of the retimed pseudo-data signal prior to comparing the retimed data signal to the retimed pseudo-data signal.

13. The method of claim 12, wherein aligning timing of the retimed data signal with timing of the retimed pseudo-data signal includes retiming both of the retimed data signal and the retimed pseudo-data signal using one or more shift registers.

14. An optoelectronic module, comprising:
an optical receiver;
a post-amplifier connected to the optical receiver; and
a retiming circuit connected to the post-amplifier and including:
a main channel decision circuit configured to receive a data signal and to output a retimed data signal;
an error channel decision circuit configured to receive the data signal and to output a retimed pseudo-data signal;
a first shift register connected to an output of the main channel decision circuit;
a second shift register connected to an output of the error channel decision circuit;

an exclusive OR circuit connected to the first shift register and the second shift register; and
a control module connected to the error channel decision circuit and the exclusive OR circuit.

15. The optoelectronic module of claim 14, wherein:
the exclusive OR circuit is configured to identify pseudo bit errors as a function of timing or threshold of the error channel decision circuit; and
the control module is configured to adjust the timing or threshold of the error channel decision circuit prior to outputting the retimed pseudo-data signal and to receive a count of pseudo bit errors from the exclusive OR circuit.

16. An optoelectronic module, comprising:
an optical receiver configured to receive an optical signal and generate an electrical data signal corresponding to the optical signal;
a post-amplifier configured to receive and amplify the electrical data signal;
a retiming circuit configured to receive the amplified electrical data signal, generate a retimed data signal and a retimed pseudo-data signal based on the electrical data signal, and compare the retimed data signal with the retimed pseudo-data signal; and
a control module configured to adjust an aspect of a first circuit of the retiming circuit configured to generate the retimed pseudo-data signal such that the aspect is different from a corresponding aspect of a second circuit of the retiming circuit configured to generate the retimed data signal, the control module further configured to identify, based on the comparison of the retimed data signal with the retimed pseudo-data signal, a pseudo error event when a bit in the retimed data signal is not substantially equal to a corresponding bit in the retimed pseudo-data signal and calculate a pseudo bit error rate based on a number of pseudo error events identified during a period of time measured by a number of clock pulses of a clock signal.

* * * * *